United States Patent [19]

Horisawa et al.

[11] 3,920,737

[45] Nov. 18, 1975

[54] RECOVERY OF FREE METHIONINE

[75] Inventors: Toshiji Horisawa; Takeshi Kojima; Ryoichi Itoh, all of Kobe, Japan

[73] Assignee: Kanegafuchi Kagaku Kogyo Kabushiki Kaisha, Osaka, Japan

[22] Filed: Oct. 25, 1973

[21] Appl. No.: 409,749

[52] U.S. Cl. ............................................. 260/534 S
[51] Int. Cl.$^2$ ......................................... C07C 99/12
[58] Field of Search ................................. 260/534 S

[56] References Cited
UNITED STATES PATENTS

| | | | |
|---|---|---|---|
| 2,178,510 | 10/1939 | Gerber et al. | 260/534 S |
| 3,433,832 | 3/1969 | Swanson et al. | 260/534 S |

FOREIGN PATENTS OR APPLICATIONS

| | | | |
|---|---|---|---|
| 1,322,106 | 7/1973 | United Kingdom | 260/534 S |
| 2,135,655 | 2/1972 | Germany | 260/534 S |

*Primary Examiner*—Richard L. Raymond
*Attorney, Agent, or Firm*—James C. Haight

[57] ABSTRACT

Free methionine is recovered from the alkali metal salt thereof by the steps: neutralizing aqueous solution of the alkali metal salt of methionine with a mineral acid, separating the resulting crystals of free methionine from the mother liquor, acidifying the mother liquor with the mineral acid, concentrating the liquor, adding the mineral acid to the concentrate, separating the alkali metal salt of the mineral acid from the mother liquor, cycling the resulting mother liquor to the neutralization step of the alkali metal salt of methionine in the subsequent cycle of the operation, and repeating the procedure.

10 Claims, No Drawings

RECOVERY OF FREE METHIONINE

This invention relates to a process for the recovery of free methionine from an alkali metal salt thereof.

Methionine is one of the essential amino acids and has been used both as a nutritional additive to animal feed and for clinical uses. Since methionine is comercially available and used in the form of its free carboxylic acid, the commercial production thereof usually includes the step of converting an alkali metal salt thereof, which is the direct product of the chemical synthesis of methionine such as Strecker's method, into the free carboxylic acid.

It has been proposed to use oximinocyanoacetic ester in ethanol after neutralizing the alkali metal salt with mineral acid, but the use of said oximinocyanoacetic ester and ethanol in large quantities makes the process costly and not suitable for commercial production. It has been also proposed to use a large excess of mineral acid to neutralize the alkali metal salt so that mineral acid salt of methionine with the mineral acid used is formed. The mineral acid salt is then converted into the free amino acid by treating with pyridine. This procedure is also uneconomical as it requires large amounts of pyridine. A further proposal was to use a cation exchange resin or membrane, but this process inherently requires the evaporation of large amounts of water and frequent regeneration of the ion exchanger used.

It is an object of the present invention to provide a process for recovery of free methionine from an alkali metal salt thereof wherein only an inexpensive mineral acid is used to recover free methionine in a pure form while avoiding substantial loss of methionine in the process. Other objects and advantages of the present invention will become clear from the following description.

According to the present invention, an aqueous solution of alkali metal salt of methionine is neutralized with a mineral acid and the resulting crystals of free methionine are recovered by filtration or centrifugation as in the conventional procedure. The mother liquor, containing the remainder of free methionine and the alkali metal salt of the mineral acid, is acidified with the mineral acid and then concentrated. To the concentrate the mineral acid is again added to precipitate the alkali metal salt of mineral acid, and the salt is recovered by filtration or centrifugation. The resulting filtrate containing the mineral acid, methionine in the form of the mineral acid salt and the inorganic salt is cycled to the subsequent neutralization step of the alkali metal salt of, and the above procedure is repeated.

More particularly, an aqueous solution of alkali metal salt of methionine such as sodium methioninate or potassium methioninate is neutralized with a mineral acid such as hydrochloric acid or sulfuric acid to neutralize the alkali metal salt into free methionine and the mineral acid salt. The free methione is remarkably less soluble in water than the mineral acid salt. For example, the solubility of sodium methioninate in 100g of water at 20°C is 3.3g whereas those of sodium chloride and sodium sulfate are 35.85g and 19.08g respectively. Major parts of the free methionine thus formed may be easily separated out by utilizing this difference in solubility. After recovering free methionine by filtration or centrifugation of the neutralized mixture, the filtrate (hereinafter referred to as "methionine filtrate") is acidified by adding the mineral acid thereto. The quantity of the mineral acid is preferably such amount as is sufficient to convert all or substantial parts of the free methionine into the mineral acid salt thereof. The use of the mineral acid in large excess is undesirable as it causes a corrosion problem of the apparatus and is conveyed to the distillate. The acidified filtrate is then concentrated, preferably under reduced pressure. If the methionine filtrate is concentrated without acidification thereof, precipitation of free methionine will take place so that the concentration to a large extent becomes difficult on account of bubbling or spattering. Besides, impurities, for example alkali metal formate formed from the starting alkali metal cyanide during the synthesis of methionine, are accumulated in the cycle of the process to give an impure final product. In the present invention, however, precipitation of methionine can be prevented due to the greater solubility of its mineral acid salt and the accumulation of the formate in the cycle can also be avoided as it becomes formic acid and is distilled off along with water during the concentration step. For example, when 860 parts by weight of methionine filtrate containing 2.5% by weight of methionine and 0.7% by weight of sodium formate was acidified with 26 parts by weight of concentrated hydrochloric acid and was concentrated, the distillate contained formic acid at a concentration of 2,600 ppm whereas the control wherein no hydrochloric acid was added gave a distillate containing no trace of formic acid.

The concentration may preferably be completed just before or after the mineral salt begins to precipitate. To the concentrate thus obtained, the mineral acid as used in the neutralizing step is added. The alkali metal salt with the mineral acid will then precipitate out as the solubility decreases, while methionine remains in the concentrate in the form of the mineral acid salt. The resulting inorganic salt is recovered by filtration or centrifugation. The filtrate containing methionine in the form of the mineral acid, the inorganic salt and the mineral acid is then cycled to the neutralizing step of the subsequent cycle of the operation to neutralize the alkali metal salt of methionine, and the procedure as described above is repeated. When the neutralizing solution reaches equilibrium after the completion of severl cycles, free methionine, the alkali metal salt of the mineral acid and formic acid, if any, may be recovered quantitatively. Free methionine thus obtained may, if desired, be purified by a conventional manner such as washing or recrystallization. The mother liquor or washing used in this purification step may be incorporated with the methionine filtrate. The inorganic salt produced as a by-product may also be purified by a conventional manner such as washing with the mineral acid or water, and the washing may also be incorporated with the methionine filtrate.

If the neutralizing solution becomes colored by the accumulation of coloring substances, decoloration may be carried out by a conventional means such as treatment with activated charcoal.

It will be easily understood that the present invention is applicable to the recovery of free methionine not only from the alkali metal salt thereof produced synthetically but also from that produced otherwise. Thus, the alkali metal salt of DL-methionine or any optically active isomer thereof may be used as the starting material.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. All parts and percentages used therein are by weight.

EXAMPLE

The first cycle of the operation:

4,000 parts of an aqueous solution containing 785 parts of sodium methioninate, 268 parts of sodium carbonate, 294 parts of sodium hydrogen carbonate and 17 parts of sodium formate were neutralized with theoretical amounts of concentrated hydrochloric acid. The resulting crystals of free methionine were filtered off and washed with water whereby 465 parts of free methionine were obtained. The purity of the product was 99.8% after washing with water whereas that of the crude product before washing was 97.5%. The filtrate and the washing were admixed and the mixture was adjusted to pH 3.3 with hydrochloric acid. The mixture was then concentrated in vacuo. The distillate contained 401 ppm of formic acid. To the concentrated mixture were added 1,150 parts of concentrated hydrochloric acid and the resulting crystals were recovered by filtering the mixture whereby 248 parts of sodium chloride having a purity of 99.7% were obtained. The filtrate was returned to the subsequent cycle of the operation.

The second cycle of the operation:

4,000 parts of an aqueous solution containing 785 parts of sodium methioninate, 268 parts of sodium carbonate, 294 parts of sodium hydrogen carbonate and 17 parts of sodium formate were neutralized with the filtrate obtained in the preceding cycle. The resulting crystals of free methionine were filtered off and washed with water, whereby 615 parts of free methionine having a purity of 99.9% were obtained. The purity of the product before washing was 97.6%. The filtrate and the washing were admixed and the mixture was adjusted to pH 3.3 with hydrochloric acid. The mixture was then concentrated in vacuo. The distillate contained 2,080 ppm of formic acid. To the concentrated mixture were added 1,150 parts of concentrated hydrochloric acid and the resulting crystals were filtered off whereby 612 parts of sodium chloride having a purity of 99.7% were recovered. The resulting filtrate was returned to the next cycle of the operation as above and the procedure was repeated.

Various other examples and modifications of the foregoing example can be devised by persons skilled in the art after reading the foregoing disclosure and the appended claims without departing from the spirit and scope of the invention. All such further examples and modifications thereof are included within the scope of said claims.

What is claimed is:

1. In a process for recovering free methionine from an alkali metal salt thereof comprising repeatedly neutralizing an aqueous solution of said alkali metal salt of methionine with a mineral acid to precipitate free methionine, separating the resulting crystals of free methionine from the mother liquor, concentrating said mother liquor, adding said mineral acid to the resultant concentrate to precipitate an alkali metal salt of said mineral acid, separating the resulting two-phase mixture to remove the alkali metal salt of said mineral acid and recycling the liquid phase as a neutralizing agent to the neutralization step of the subsequent cycle of the process, the improvement which comprises:

acidifying said mother liquor prior to the concentration step with approximately a stoichiometric amount of said mineral acid to convert free methionine present in the mother liquor to its acid-addition salt with said mineral acid.

2. A process according to claim 1, wherein said alkali metal salt is the sodium salt or the potassium salt.

3. A process according to claim 1, wherein said mineral acid is hydrochloric acid or sulfuric acid.

4. A process according to claim 1, wherein the starting alkali metal salt of methionine contains an alkali metal formate as an impurity, further comprising removing said impurity from the cycled system as formic acid along with water during the concentration step.

5. A process according to claim 1, wherein said crystals of free methionine are filtered off and washed with water, and the filtrate and the washing liquor are admixed prior to recycling.

6. A process according to claim 1, wherein the alkali metal salt of methionine is produced by a chemical synthesis.

7. A process according to claim 1, wherein said concentration is carried out under reduced pressure.

8. A process according to claim 1, wherein said cycling liquor is decolored prior to the subsequent cycle of the operation.

9. A process according to claim 1, wherein said alkali metal salt is the sodium salt or the potassium salt; said mineral acid is hydrochloric acid or sulfuric acid; and wherein said crystals of free methionine are filtered off and washed with water, and the filtrate and the washing are admixed prior to recycling.

10. A process according to claim 9, wherein the starting alkali metal salt of methionine contains an alkali metal formate as an impurity, further comprising removing said impurity from the cycled system as formic acid along with water during the concentration step.

* * * * *